(12) United States Patent
Kumata et al.

(10) Patent No.: US 6,965,380 B1
(45) Date of Patent: Nov. 15, 2005

(54) USER INTERFACE FOR ANALYZING MULTIPLE DIMENSION DATA

(75) Inventors: Kiyoshi Kumata, Tokyo (JP); Hiroyuki Ogura, Yokohama (JP); Hiroshi Satoh, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/537,937

(22) Filed: Mar. 29, 2000

(30) Foreign Application Priority Data

Mar. 29, 1999 (JP) .................................. 11-085379

(51) Int. Cl.[7] ............................................. G06T 11/20
(52) U.S. Cl. ...................................................... 345/440
(58) Field of Search ......................................... 345/440

(56) References Cited

U.S. PATENT DOCUMENTS 5,739,824 A * 4/1998 Dietrich et al. ............. 345/440

6,144,379 A * 11/2000 Bertram et al. ............. 345/835

* cited by examiner

Primary Examiner—Sumati Lefkowitz
Assistant Examiner—Motilewa Good-Johnson
(74) Attorney, Agent, or Firm—Gregory M. Doudnikoff

(57) ABSTRACT

A user interface for analyzing multiple dimension data, with which a great number of multiple dimension data sets can be easily and intuitively analyzed and edited. At the least, data having two dimensions are selected from among multiple dimension data. Then, the selected data are assigned to respective coordinate axes so that the coordinate axes cross each other, or intersect each other if two-dimensional data are selected. The coordinate axes are divided, using a predetermined threshold value, into a number of segments, and these segments are assembled to define composite areas for all the coordinate axes. Data are displayed in each of the composite areas in order to enable analysis and editing of multiple dimension data. As a result, in the preferred embodiment, a great number of multiple dimension data sets can be easily and intuitively analyzed and edited.

5 Claims, 5 Drawing Sheets

USER INTERFACE FOR ANALYZING MULTIPLE DIMENSION DATA

BACKGROUND OF THE INVENTION

1. Field of the Invention

The present invention relates to a user interface for analyzing of large quantities of data having multiple dimensions.

2. Description of the Related Art

There is a continuing demand for improved methods for analyzing and editing, as sets of appropriate threshold data, large quantities of data having multiple dimensions, such as data used for financial data risk management.

Some well known techniques have been devised to cope with this demand. According to one such technique, a program is used to prepare a distribution graph. To prepare a distribution graph, two selected sets of data for multiple dimensions are used as coordinates for plotting dots for axes. Since a distribution graph is a graphical representation, its use is intuitive and it is very easy to understand. According to another technique, a program is used that employs macros to prepare data sets. To prepare a set of data by using a program that employs macros, the ranges for data having multiple dimensions can be determined by the program, and sets of data can be described. Since the ranges of data can be described in great detail, all kinds of data sets can be described.

However, drawbacks exist with the prior art techniques. If a distribution graph is employed, each set of data constitutes an editing unit. When there are too many data sets, selecting a specific data set is not possible. In addition, while a method for designating ranges for a distribution graph using rectangular marks can be employed, such designations must be made during each editing session, and since the range designations are performed by eye, it is difficult to consistently make selections having the same measurements. Furthermore, since a programming language should be used when describing the range for the data in order to prepare a set of data that uses a program employing macros, some knowledge of the programming language is required. Further, intuitively, it is difficult to understand what relationship exists between a specific data set and another data set.

To resolve the above shortcomings, one object of the present invention is to provide a user interface for the analysis of data with which a large quantity of data sets using multiple dimensions can be easily and intuitively analyzed.

SUMMARY OF THE INVENTION

A user interface, according to the present invention, for analyzing and editing data having multiple dimensions, first selects, at the least, data having two dimensions from among data having multiple dimensions. Then, the selected data are assigned to respective coordinate axes so that the coordinate axes cross each other, or intersect if data having two dimensions are selected. The coordinate axes are divided by a predetermined threshold value to obtain a predetermined number of segments, and these segments are assembled to define composite areas for all the coordinate axes. Data are displayed in each of the composite areas in order to enable analyzation of data having multiple dimensions. In the preferred example, data in all of the composite areas can be selected and edited.

According to the present invention, for example, data having two dimensions are selected from multiple dimension data and are assigned to coordinate axes that intersect each other, and a predetermined number is used to divide up each of the coordinate axes to provide a user interface including composite areas, i.e., areas having the structure of a lattice (in the shape of a panel). Since each of the rectangles in such a lattice is defined as a unit of data sets in the rectangular range, a great number of multiple dimension data can be easily and intuitively analyzed.

DESCRIPTION OF THE PREFERRED EMBODIMENT

Figure 1:
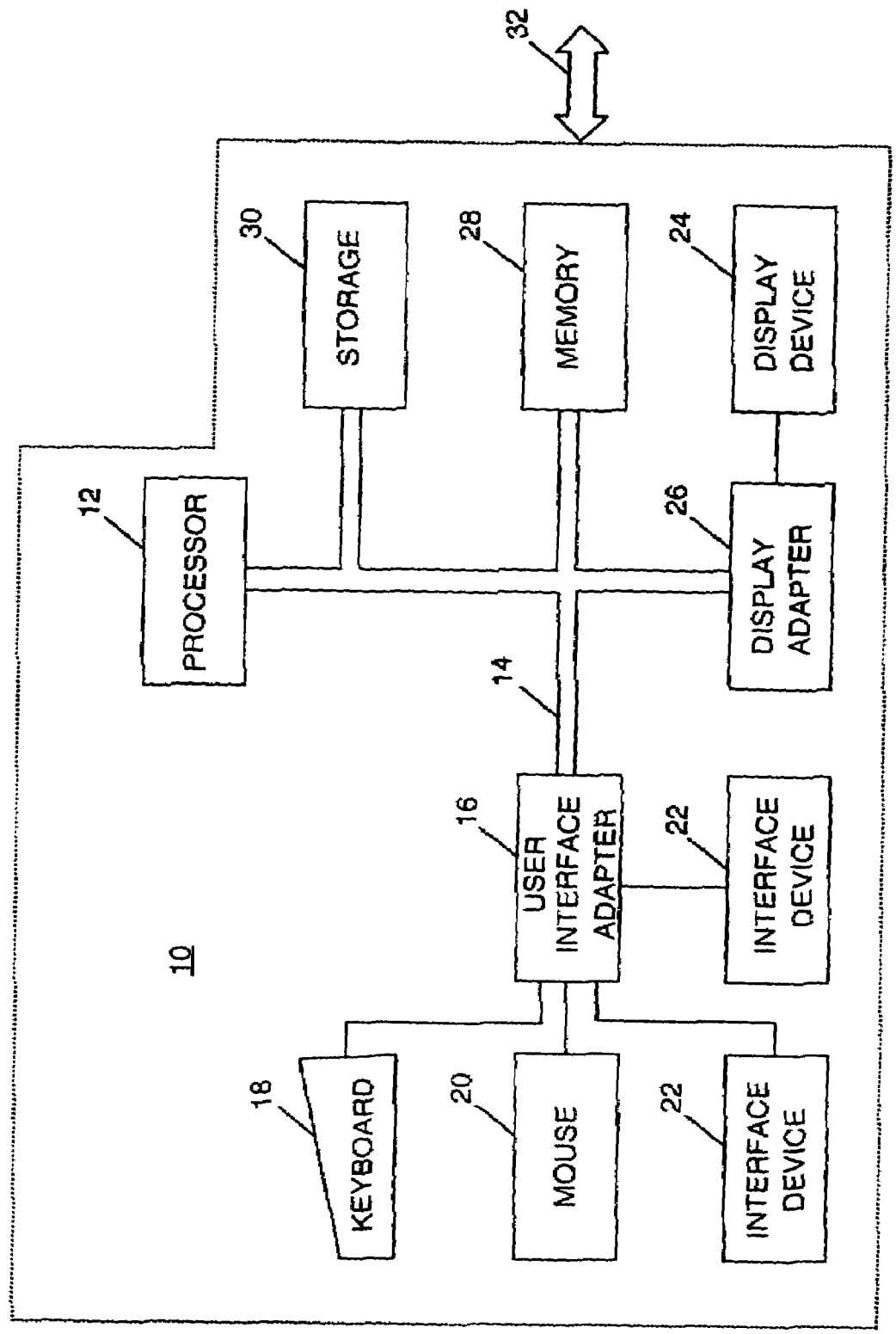
FIG. 1 is a flowchart showing example processing for a user interface for analyzing multiple dimension data according to the present invention.

FIG. 1 is a flowchart showing processing performed for creating a user interface for display which permits the analysis of multiple dimension data. First, an arbitrary number of data types is selected from among those corresponding to the dimensions of multiple dimension data (Step S1). The number of selected data types is not limited, and normally, two or three types of data are selected for display. The selected dimension data are assigned to respective coordinate axes so that the coordinate axes intersect each other (Step S2). Thus, actually, data are displayed in two dimensions or three dimensions; however, since the data types are not limited to two or three dimensions, as is described above, no limit is imposed on the number of dimensions that can be displayed.

Each of the coordinate axes is divided into an arbitrary number of segments by using a predetermined threshold value (Step S3). Then, the obtained segments are assembled to define composite areas for all the coordinate axes, and are used as references for multiple dimension data within range of the threshold value (Step S4). The multiple dimension data are then displayed in corresponding composite areas that serve as references (Step S5).

Analysis and editing of multiple dimension data that are displayed are performed as follows. A check is performed to determine whether, based on the display, a selection is to be performed for each of the composite areas (Step S6). When a selection is instructed, an arbitrary number of references that denotes the units of the composite areas is selected (Step S7). Then, a check is performed to determine whether the instruction is for processing of multiple dimension data (Step S8). If the instruction is for processing of multiple dimension data, editing of the multiple dimension data, such as the changing of the data type of the multiple dimension data, is performed (Step S9). Program control thereafter returns Step S5. If at Step S8 the instruction is not for processing of multiple dimension data, editing of a set of multiple dimension data, i.e., a reference, such as copying, moving, deletion and pasting of multiple dimension data, is performed (Step S10). Program control thereafter returns to Step S5.

When, at Step S6, selection is not instructed, processing proceeds to Step S11 and a check is performed to determine whether a threshold value should be changed. When the threshold value should be changed, program control returns to Step S3. When the threshold value should not be changed, a further check is performed to determine whether the data type to be selected should be changed in Step S12. If the selected data type is to be changed, program control returns to Step S1. However, if the selected data type need not be changed, program control returns to Step S6.

Figure 2:
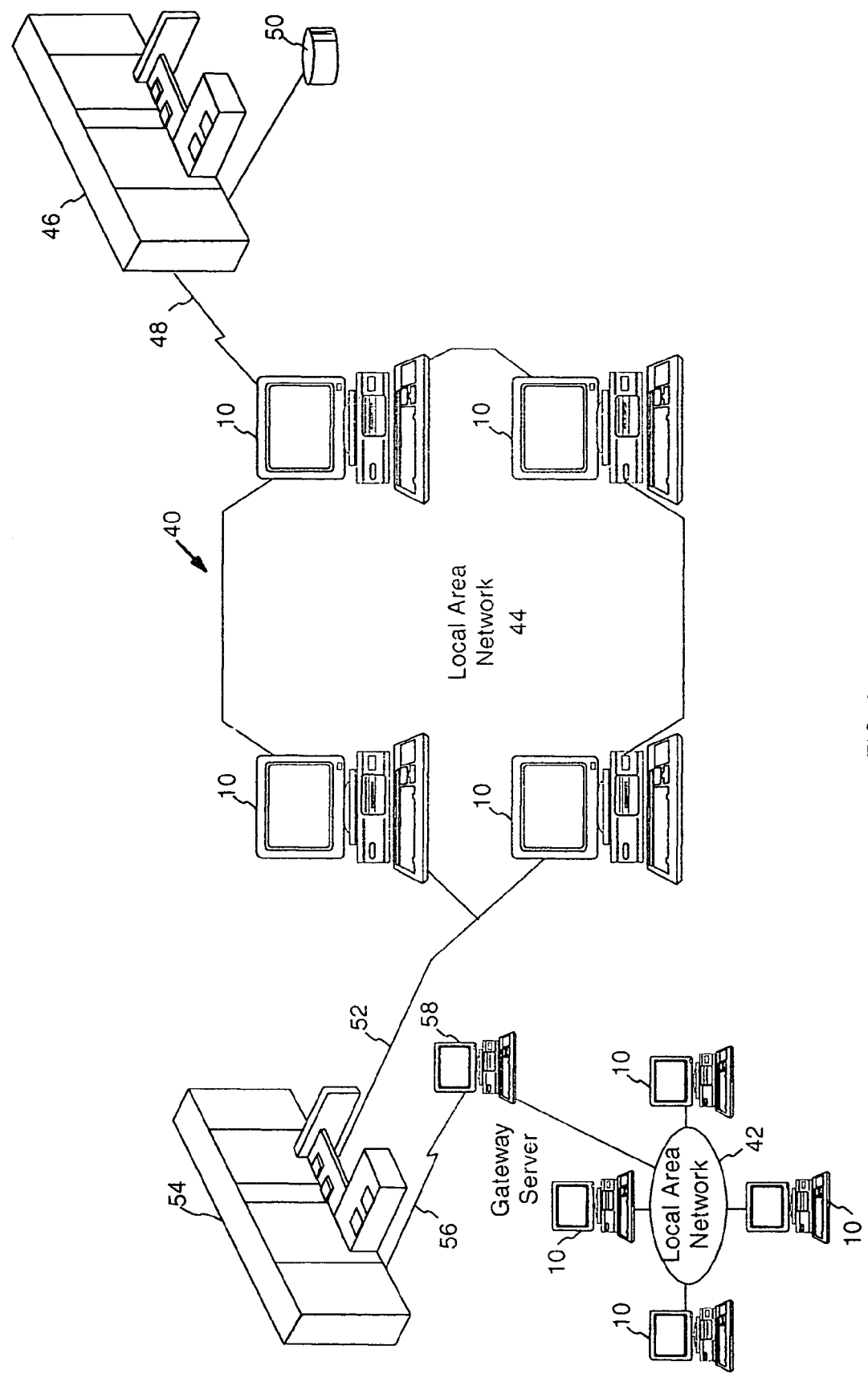
FIG. 2 is a diagram for explaining a composite area for the user interface according to the present invention.

FIG. 2 is a diagram for explaining the definition of composite areas in the user interface for the analysis of multiple dimension data according to the present invention. In the example in FIG. 2, from among the multiple dimension data, including several data types of parameter 1 to parameter n, parameters 2 and 5 are selected and are displayed in two dimensions. For two-dimensional display, in order to set delimiters along the coordinate axes, threshold values R2.0 to R2.5 are used for parameter 2 and threshold values R5.0 to R5.6 are used for parameter 5, so that composite areas Ref0.0 to Ref4.5, i.e., the rectangular areas in the lattice-like structure, are defined.

Assuming that data in parameter 2 is p2 and data in parameter 5 is p5, Ref1.3 is displayed as (R2.1œp2<R2.2) AND (R5.3œp5<R5.4), Ref4.0 is displayed as (R2.4œp2<R2.5) AND (R5.0œp5<R5.1), and Ref2.2 is displayed as (R2.2œp2<R2.3) AND (R5.1œp5<R5.2). Although in the example in FIG. 2 a value lying between the threshold values is changed at random, it is preferable that at the first display the interval between the minimum value and the maximum value along each coordinate axis be divided by an interval equivalent to an arbitrary number in order to make understanding of the drawing more intuitive.

Figure 3:
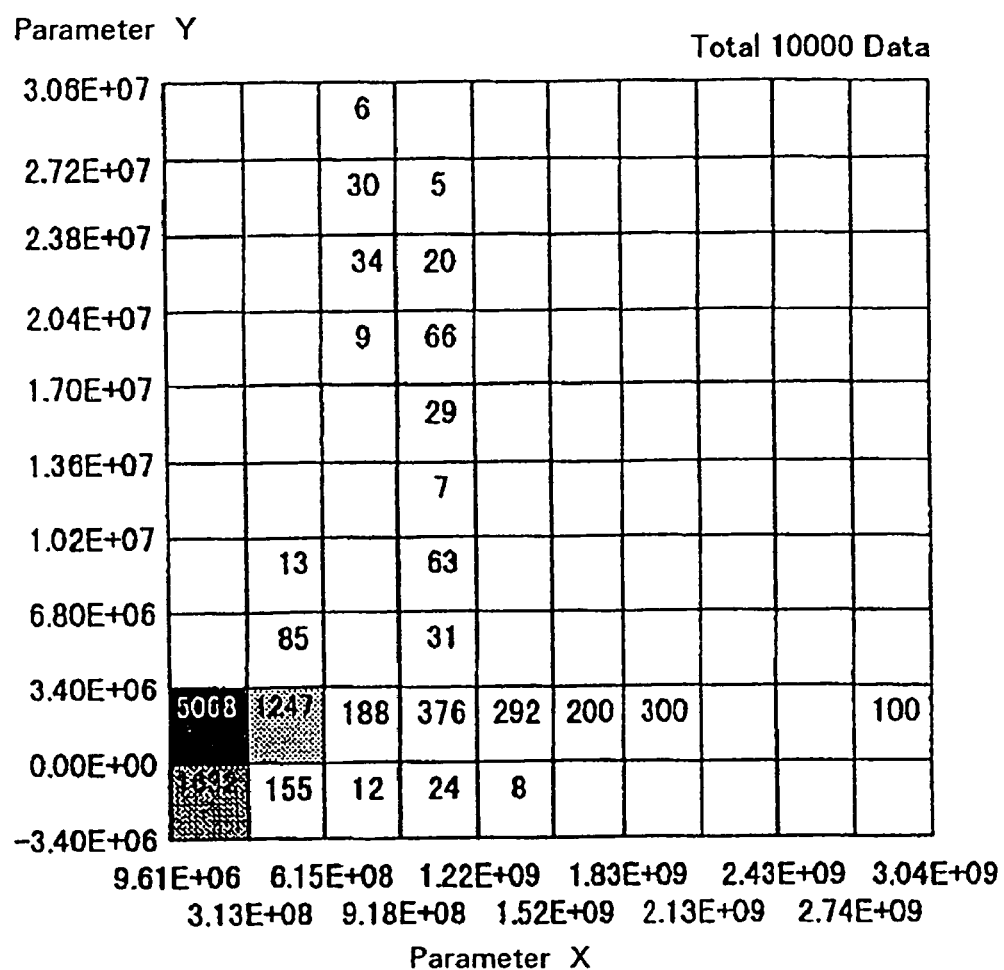
FIG. 3 is a diagram of an example data display wherein each composite area for the user interface is shown according to the present invention.
Figure 4:
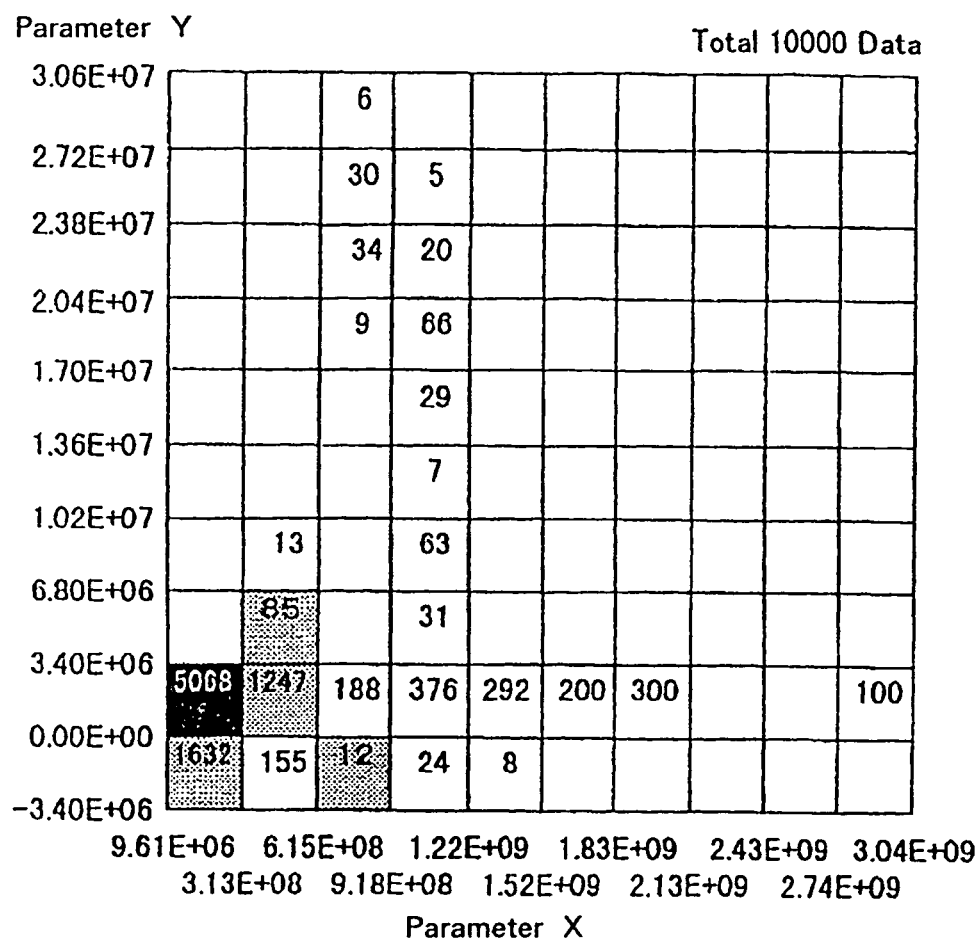
FIG. 4 is a diagram of another example data display wherein each composite area for the user interface is shown according to the present invention.
Figure 5:
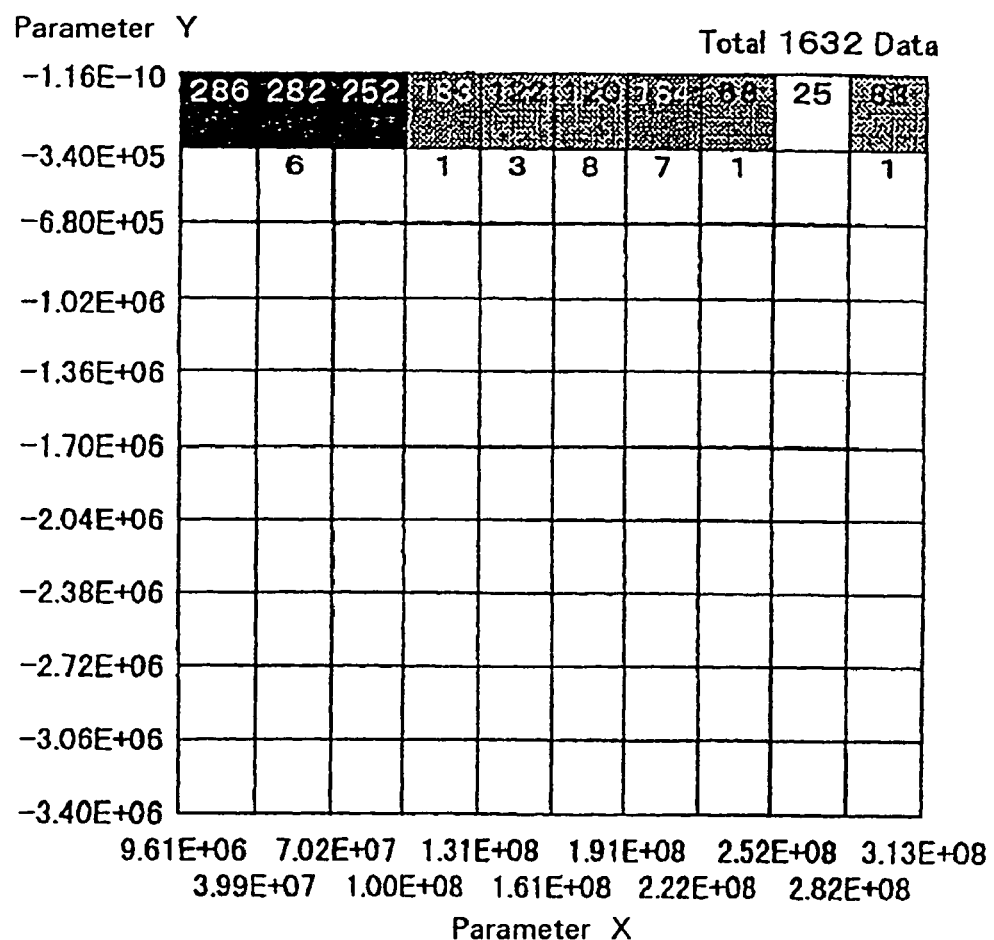
FIG. 5 is a diagram of an additional example data display wherein each composite area for the user interface is shown according to the present invention.

In each of FIGS. 3 to 5 is a diagram showing an example of the displayed data, in composite areas for the user interface of the present invention, for analysis and editing of multiple dimension data. In FIGS. 3 to 5, 10000 sets of multiple dimension data, including specific parameters X and Y, are used. The numerals along the X axis and Y axis represent threshold values. The numbers in rectangular areas, i.e., in this case in square areas, which are composite areas delimited by threshold values, indicate how many data sets there are in the individual ranges. For example, the number 1632 is entered in the bottom left rectangular area in FIG. 3 indicates that there are 1632 data sets that fall in the range of the delimiting parameters Y, extending from −3.40E+06 to 0.00E+06, and X, extending from 9.61E+06 to 3.13E+08. In the example in FIG. 3, color densities of the rectangles are changed in accordance with the number of data sets. Thus, process of grasping the distribution of data is rendered more intuitive.

In this invention, editing of each composite area is performed by selecting a rectangular area. Three rectangles are selected in the example in FIG. 4, and the selected portions are displayed in turquoise (dithered in FIG. 4). In this case, three groups of data sets are selected, i.e., 1632 data sets, 85 data sets and 12 data sets. From this we can ascertain that 1729(1632+85+12) data sets have been selected. The editing process is then performed for each of these selected data sets. Assume that, in accordance with a command entered at a keyboard or with a mouse, 1729 data sets are selected and a "delete" action is instructed. In this case, of the two-dimensional data obtained from the available multiple dimension data, 1729 selected data sets are deleted. Specifically, data that fall in the selected rectangular areas are extracted and deleted. The data sets in rectangles can be represented as a smaller group of data. The maximum value and the minimum value of that rectangle are reset, and a predetermined number of delimiters are set. In FIG. 5, 1632 data sets in the bottom left rectangle in FIG. 4 are displayed as 17 groups of data sets.

In the above embodiment, multiple data sets are displayed by indicating the number of data sets in a rectangular frame or by changing colors in accordance with the number of data sets. However, other display methods may be used for the present invention. The same axis to which selected dimension data are assigned can be used, and in accordance with a command entered at a keyboard or with a mouse, the data in a rectangular frame can be displayed in a distribution graph wherein corresponding dots are plotted along that axis. In addition, in accordance with a command entered at the keyboard or with the mouse, the above described distribution graph can be displayed together with the rectangular frame already presented. In the above embodiment, the displayed data have two dimensions. However, an application program available on the market can be used to display the distribution of data in three dimensions, so that data can be analyzed at various angles, while observation points are changed freely. As another method, a plurality of views, e.g., two views, where various data types are used as variables, are used, and when specific dimension data in one of the views selected, the distribution of the selected data can be dynamically seen in another view. The same process can be performed as an extension among more than two views.

As is apparent from the above description, according to the present invention, since two-dimensional data, for example, are selected from among multiple dimension data and are assigned to respective coordinate axes, and since the coordinate axes are divided at arbitrary delimiters, a user interface including composite areas, or areas having a lattice shape (having a panel shape) can be prepared in this case. Since one of the rectangles in the lattice is the group unit of data that fall in the rectangular area, in the preferred embodiment a great deal of multiple dimension data can be easily and intuitively analyzed and edited.

FIG. 6 illustrates a representative workstation hardware environment in which the present invention may be practiced. The environment of FIG. 6 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

FIG. 7 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 7, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

What is claimed:

1. A method for displaying on a user interface information for analyzing multiple dimension data, comprising the steps of:

assigning at least two-dimensions selected from the multiple dimension data to respective coordinate axes which intersect each other;

dividing said coordinate axes into a predetermined number of segments using a predetermined threshold value;

assembling said predetermined number of segments for said coordinate axes to define composite areas;

displaying data in each of said composite areas; and enabling selection and editing by a user of individual data displayed in one of said composite areas.

2. The method according to claim 1, wherein delimiters between said predetermined number of segments, which are obtained by dividing each of said coordinate axes by said predetermined threshold value, are acquired by dividing a distance lying between a minimum value and a maximum value for each of said coordinate axes by an interval having a value equivalent to an arbitrary number.

3. The method according to claim 1, wherein said data in said composite areas are displayed by indicating a number of multiple dimension data sets located in each of said composite areas.

4. The method according to claim 1, wherein said data in said composite areas are displayed by changing colors in accordance with a number of multiple dimension data sets displayed in each of said composite areas.

5. The method according to claim 1, wherein said data in said composite areas are displayed by using a distribution graph wherein dots are plotted along coordinate axes for data selected from said multiple dimension data displayed in said composite areas.

* * * * *